(12) United States Patent
Gardstam

(10) Patent No.: US 8,931,990 B2
(45) Date of Patent: Jan. 13, 2015

(54) PIERCE NUT AND USE THEREOF

(75) Inventor: Johannes Gardstam, Sollentuna (SE)

(73) Assignee: Stromsholmen AB, Tranas (SE)

( * ) Notice: Subject to any disclaimer, the term of this patent is extended or adjusted under 35 U.S.C. 154(b) by 1800 days.

(21) Appl. No.: 11/788,508

(22) Filed: Jun. 5, 2007

(65) Prior Publication Data

US 2007/0258788 A1 Nov. 8, 2007

(51) Int. Cl.
*F16B 37/04* (2006.01)
*F16B 37/06* (2006.01)
*B23P 19/06* (2006.01)

(52) U.S. Cl.
CPC ............ *F16B 37/068* (2013.01); *B23P 19/062* (2013.01)
USPC ....................................................... 411/180

(58) Field of Classification Search
USPC ......... 411/172, 176, 178, 179, 180, 181, 182, 411/183, 184, 187, 188
See application file for complete search history.

(56) References Cited

U.S. PATENT DOCUMENTS

| | | | |
|---|---|---|---|
| 2,327,656 A * | 8/1943 | Meek | 285/202 |
| 2,486,769 A | 11/1949 | Watson | |
| 3,253,631 A | 5/1966 | Babej | |
| 3,299,500 A | 1/1967 | Double | |
| 4,744,187 A * | 5/1988 | Tripp | 52/410 |
| 5,340,251 A | 8/1994 | Takahashi et al. | |
| 5,502,888 A | 4/1996 | Takahashi et al. | |
| 5,743,691 A * | 4/1998 | Donovan | 411/180 |
| 6,220,804 B1 * | 4/2001 | Pamer et al. | 411/180 |
| 6,382,893 B1 * | 5/2002 | Reed | 411/178 |
| 6,439,817 B1 * | 8/2002 | Reed | 411/110 |
| 6,986,629 B2 | 1/2006 | Babej | |
| 2003/0145448 A1 | 8/2003 | Babej | |
| 2005/0103086 A1 | 5/2005 | Wojciechowski et al. | |
| 2005/0147481 A1 | 7/2005 | Wojciechowski | |
| 2005/0186046 A1 | 8/2005 | Shinjo | |

FOREIGN PATENT DOCUMENTS

| | | |
|---|---|---|
| DE | 10 2004 017 866 | 3/2005 |
| DE | 103 48 851 | 7/2005 |
| DE | 103 48851 | 7/2005 |
| EP | 0554599 | 8/1993 |
| EP | 0 554 599 | 3/1996 |
| EP | 0 553 822 | 1/2003 |
| JP | 46-23085 | 7/1976 |
| JP | 64-58807 | 3/1989 |
| JP | 1058807 | 3/1989 |
| JP | 5-215115 | 8/1993 |
| JP | 2004-205001 | 7/2004 |
| JP | 2005-515380 | 5/2005 |
| JP | 100082 | 5/2012 |
| WO | WO 03/062652 | 7/2003 |
| WO | WO 2005/099930 A1 | 10/2005 |
| WO | WO 2007/121998 | 11/2007 |

* cited by examiner

*Primary Examiner* — Roberta Delisle

(74) *Attorney, Agent, or Firm* — Fay Sharpe LLP

(57) ABSTRACT

A pierce nut (1) for attachment to a plastically deformable metal sheet (4) has an abutment surface (14) adapted to abut against the metal sheet (4), an undercut pilot (11) protruding relatively to the abutment surface (14), and a countersunk groove (16a, 16b) which is formed in the abutment surface (14) and at least partly surrounds the pilot (11). The groove (16a, 16b) is without active undercuts facing the pilot (11). The groove comprises an inner groove (16a) and an outer groove (16b) and a ridge (17) located therebetween.

27 Claims, 6 Drawing Sheets

PIERCE NUT AND USE THEREOF

The present invention claims priority on U.S. Provisional Patent Application Ser. No. 60/794,520 filed Apr. 25, 2006, which is incorporated herein.

The present invention relates to a pierce nut and to the use of such a pierce nut. More specifically, the present invention concerns a pierce nut that is particularly suited for high-strength sheet metal.

BACKGROUND OF THE INVENTION

Pierce nuts have been used in mass production applications for many years. In the automotive industry, they are used to allow the mounting of components in metal sheets and panels. In general, to attach these components, threaded screws or bolts are used, and the joint can be tightened by means of a torque wrench.

Previously, there was a general tendency in the automotive industry to use thin metal sheets and panels to reduce the weight of the vehicles. Thus, the focus was on the development of pierce nuts designed to provide high torque resistance and pull-through resistance, also when used with very thin sheets.

The latest trend in the automotive industry is toward an extended use of high-strength sheet metal. By optimizing each individual component of a vehicle with respect to its intended function, it is possible to reduce the weight and the impact on the environment and also to improve vehicle safety. Thus it is necessary to have pierce nuts designed to provide even higher torque resistance and pull-through resistance, requirements that cannot be satisfied by existing nuts. Other affected parameters whose importance increases are punching force, tool damage and nut centering; as the strength of the punched metal sheet increases, greater punching force is required, which increases the load on the punching tools as well as the risk of alignment errors occurring between the pierce nut and the punching die, thereby increasing the risk of tool damage.

Pierce nuts should be attached to the metal sheet in such manner that they resist both pull-through forces and torque.

U.S. Pat. No. 5,340,251 proposes a pierce nut for attachment to a plastically deformable metal sheet, comprising an engagement side for engaging the metal sheet and a pilot extending from the engagement side in the direction away from the engagement side, which pilot has an end surface that faces away from the engagement side, and a first undercut portion facing away from the pilot and having a wall surface surrounding the end face. Moreover, the pierce nut has a second undercut portion oriented towards the pilot, and a groove located between the two undercut portions. When using the pierce nut disclosed in U.S. Pat. No. 5,340,251, the sheet is plastically deformed and pressed into the groove and beneath the two undercut portions, thereby to achieve a form-fit interlock between the nut and metal sheet. The pierce nut disclosed in U.S. Pat. No. 5,340,251 requires substantial deformation of the metal sheet to push it under the undercut portions, which in connection with high-strength sheet metal increases the stress on the pilot of the pierce nut, necessitates great punching force and, thus, increases wear also on the punching die. In addition, when using the pierce nut according to U.S. Pat. No. 5,340,251, a thin section is obtained between the punching die and the engagement side of the nut, which section is susceptible to fatigue failure.

In European Patent No. 0 554 599 B1, a pierce nut for attachment to a plastically deformable metal sheet is disclosed which comprises an engagement side for engaging the metal sheet and a pilot extending from the engagement side in the direction away from the engagement side, which pilot has an end surface that is facing away from the engagement side and a wall surface surrounding the end surface. The pierce nut further has an undercut portion oriented towards the pilot, and a groove located between the pilot and the undercut portion. When using the pierce nut according to EP 0 554 559 B1 for punching high-strength sheet metal, an insufficient amount of sheet metal is pushed into the groove and beneath the undercut portion, which results in a joint with low pull-through strength. In addition, greater punching force is required to deform the metal sheet, which may cause damage to the punching die. Furthermore, the pierce nut disclosed in EP 0 554 599 B1 is susceptible to alignment errors between the pierce nut and the punching die, which may result in the pierce nut threads being damaged or their mechanical properties becoming irregular.

German Patent No. DE 2004 017 866 A1 discloses a pierce nut for attachment to a plastically deformable metal sheet.

Further examples of pierce nuts are shown in DE 103 48 851 A1; US 2005/0186046 A1; U.S. Pat. No. 6,986,629 B2; US 2005/0147481 A1 and JP 64-58807.

There is a need for an improved pierce nut, which eliminates or reduces the problems discussed above.

SUMMARY OF THE INVENTION

An object is therefore to provide a pierce nut that eliminates or reduces the problems associated with prior art pierce nuts.

The present invention relates to a pierce nut for attachment to a plastically deformable metal sheet. The pierce nut includes an abutment surface that is adapted to abut against the metal sheet, an undercut pilot that protrudes relative to the abutment surface, and a countersunk groove which is formed in the abutment surface and at least partly surrounds the undercut pilot. The countersunk groove does not include active undercuts that face the undercut pilot. The countersunk groove include an inner groove, an outer groove, and a ridge located therebetween. The outer groove is at least partially defined by a surface portion that faces a wall surface surrounding the undercut pilot and faces away from the pierce nut. The pierce nut can include a first angle between an end surface of the undercut pilot and a wall surface that extends around the undercut pilot, which angle is about 69-89 degrees, typically about 74-84 degrees, and more typically about 78-80 degrees. The inner groove of the countersunk groove can include a first surface portion which can, when viewed in a sectional plane through the center of the pierce nut and perpendicularly to an end surface of the undercut pilot, exhibit essentially the same angle to the end surface as a wall surface surrounding the undercut pilot. The inner groove can include a second surface portion which is oriented towards the undercut pilot and which, when viewed in a sectional plane through the center of the pierce nut and perpendicularly to an end surface of the pierce nut, exhibits a second angle relatively to the end surface, which second angle is about 35-55 degrees, generally about 40-50 degrees, a typically about 45 degrees. The inner groove can also include a third surface portion which extends between the first and second surface portions. The outer groove can include a fourth surface portion that faces away from a wall surface surrounding the undercut pilot and which, when viewed in a sectional plane through the center of the pierce nut and perpendicularly to an end surface of the pierce nut, exhibits a third angle to the end surface, which third angle is about 15-45 degrees. The surface portion which faces the wall surface that surrounds the undercut pilot and thus defines the outer groove can form a fifth surface portion which, when viewed in a sectional plane through the center of the pierce nut and perpendicularly to an end surface of the pierce nut, exhibits a fourth angle to the end surface, which fourth angle is about 10-70 degrees, and more typically about 30-45 degrees. The outer groove can be defined by a sixth surface portion which extends between the fourth and fifth surface portions. At least one of the first, second, fourth and fifth surface portions can exhibit a straight line extending through the sectional plane. The straight line in the sectional plane can extend through essentially the whole surface portion concerned. The second and fourth surface portions, when viewed in the sectional plane, can form an angle with one another. The groove, can be designed to surround the undercut pilot. The groove can be essentially annular. The undercut pilot can be essentially annular. The undercut pilot and the groove can be essentially concentric. The ridge can have an edge. The edge can have a diameter that is about 1.45 mm±0.1 mm greater than a maximum diameter of the undercut pilot. The smallest distance between a plane that contains an end surface of the pierce nut and the edge can be greater than or equal to the smallest distance between the plane containing the end surface and an abutment surface that is adapted to abut against the metal sheet to which the pierce nut is designed to be attached. The smallest distance between the plane that contains the end surface) and the edge can be about 0.67-1.14 times the thickness of the metal sheet to which the pierce nut is designed to be attached. When the thickness of the metal sheet is about 0.7-1.2 mm, the smallest distance is generally about 0.8 mm. The smallest distance between the plane that contains the end surface and the edge can be about 0.75-0.92 times the thickness of the metal sheet to which the pierce nut is designed to be attached. When, the thickness of the metal sheet is about 1.3-1.6 mm, the smallest distance is about 1.2 mm. The piece nut can include anti-rotation means. The anti-rotation means can be positioned in the groove. The pierce nut can include an internally threaded portion. The pierce nut can include an externally threaded portion. The piercing nut can used in a system that includes a high-strength metal sheet and wherein the pierce nut is attached the metal sheet by punching.

It is thus provided a pierce nut for attachment to a plastically deformable metal sheet, the pierce nut comprising an abutment surface adapted to abut against the metal sheet, an undercut pilot protruding relatively to the abutment surface, and a countersunk groove which is formed in the abutment surface and at least partly surrounds the pilot, the groove being without active undercuts oriented towards the pilot. The groove comprises an inner groove and an outer groove and a ridge located therebetween. The outer groove is at least partially defined by a surface portion, which faces a wall surface surrounding the pilot and away from the pierce nut.

The abutment surface is a surface adapted to abut against the metal sheet, essentially without penetrating the sheet.

The limiting surfaces of the groove are facing obliquely away from the pierce nut, i.e., at an angle to the metal sheet, in such manner that none of them form an undercut portion.

By using a pierce nut without an undercut portion in the groove, the deformation of the sheet is reduced, which results in an increased strength of the joint formed by the pierce nut and the sheet, while at the same time the ridge helps push sheet material towards the undercut pilot, thereby achieving a form-fit interlock between the nut and metal sheet.

A first angle between an end surface of the pilot and a wall surface surrounding the pilot may be about 79±1 degrees.

This angle has been found to be optimal for making the pierce nut work with high-strength sheet metal, but also with standard sheet metal.

The inner groove may be defined by a first surface portion, which, when viewed in a sectional plane through the center of the pierce nut and perpendicularly to an end surface of the pilot, has essentially the same angle to the end surface as a wall surface surrounding the pilot.

The inner groove may be defined by a second surface portion, which is oriented towards the pilot and which, when viewed in a sectional plane through the center of the pilot and perpendicularly to an end surface of the pilot, exhibits a second angle to the end surface, which second angle may be about 35-55 degrees, typically about 40-50 degrees, and more typically about 45 degrees.

The inner groove may be defined by a third surface portion, which extends between the first and the second surface portions.

The outer groove may be defined by a fourth surface portion, which faces away from a wall surface surrounding the pilot and which, when viewed in a sectional plane through the center of the pilot and perpendicularly to an end surface of the pilot, exhibits a third angle to the end surface, which third angle is from about 15 degrees and about 45 degrees.

The surface portion, which faces the wall surface surrounding the pilot and thus defines the outer groove, may be a fifth surface portion, which, when viewed in a sectional plane through the center of the pilot and perpendicularly to an end surface of the pilot, exhibits a fourth angle to the end surface, which fourth angle is from about 10 degrees and about 70 degrees, and typically from about 30 degrees and about 45 degrees.

In another embodiment, the fourth angle may be from about 30 and 45 degrees.

The outer groove may be defined by a sixth surface portion, which extends between the fourth and fifth surface portions.

At least one of the first, second, fourth and fifth surface portions may be such as to exhibit a straight line that extends through the sectional plane. Thus, when viewed in cross-section, the surface portion may be planar.

The straight line may, in said sectional plane, extend through essentially the whole surface portion concerned.

The second and fourth surface portions may, when viewed in the sectional plane, form an angle with one another.

The groove may surround the pilot and may be essentially annular. The pilot too may be essentially annular.

The pilot and the groove may be essentially concentric.

The ridge may have an edge.

An edge of this kind allows optimal guidance of the metal sheet into the inner groove and the outer groove. The edge may be relatively pointed.

The edge may have a diameter that is about 1.45±0.1 mm larger than a maximum diameter of the pilot.

The smallest distance between a plane containing an end surface of the pierce nut and the edge may be greater than or equal to a smallest distance between the plane containing the end surface and an abutment surface adapted to abut against the metal sheet to which the pierce nut is designed to be attached.

The smallest distance between the plane containing the end surface and the edge may be from about 0.67 and about 1.14 times a thickness of the metal sheet to which the pierce nut is designed to be attached, generally about 0.8 mm, for pierce nuts designed for use with metal sheets with a thickness of about 0.7 mm to about 1.2 mm.

Thus, a pierce nut that is optimized for thin high-strength metal sheets is achieved.

The smallest distance between the plane containing the end surface and the edge may be from about 0.75 and about 0.92 times a thickness of the metal sheet to which the pierce nut is designed to be attached, generally about 1.2 mm, for pierce nuts designed for use with metal sheets with a thickness of about 1.3 mm to about 1.6 mm.

Thus, a pierce nut that is optimized for thick high-strength metal sheets is achieved.

The pierce nut may further comprise anti-rotation means. Such anti-rotation means allow further improvement of the torque resistance of the pierce nut.

Anti-rotation means may comprise recesses and/or depressions in, for example, the groove, on/in the ridge located in the groove, on/in the wall surface surrounding the pilot, on/in the abutment surface or on/in the external wall.

The pierce nut may comprise an internally threaded portion. Such a pierce nut can be used to receive an externally threaded part, such as a screw or bolt.

Alternatively, the pierce nut may comprise an externally threaded portion. Such a pierce nut can be used to receive an internally threaded part, such as a nut.

According to a second aspect, a system is provided comprising a high-strength metal sheet and a pierce nut attached thereto by means of punching.

High-strength metal sheet here refers to metal sheets made of high-strength steel, i.e., steel with a tensile yield limit exceeding about 220 MPa, and typically exceeding about 290 MPa.

According to a third aspect, use of a pierce nut as described above is provided for attachment thereof to a high-strength metal sheet.

According to a fourth aspect, a method for mounting an attachment means in a high-strength metal sheet is provided, wherein the attachment means is a pierce nut as described above.

DESCRIPTION OF EMBODIMENTS OF INVENTION

Figure 1:
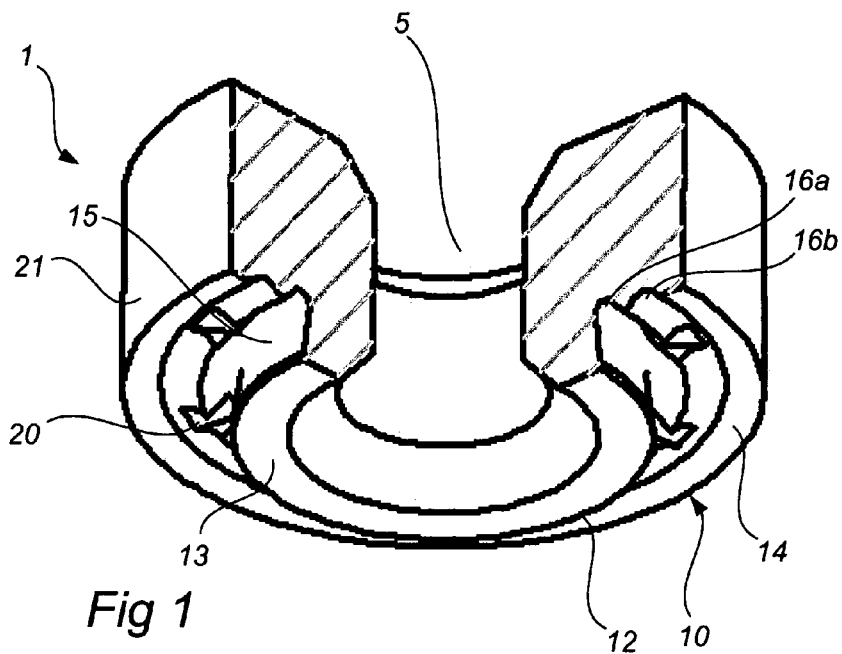
FIG. 1 is a perspective view of a pierce nut, a segment thereof having been removed.
Figure 2:
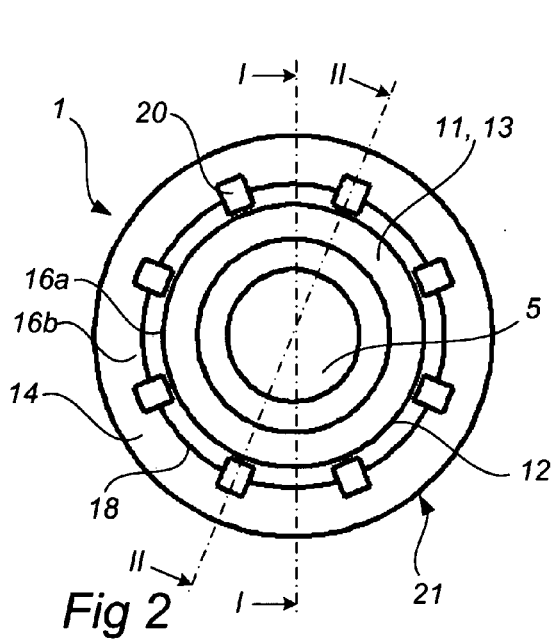
FIG. 2 is a plan view of the engagement side of the pierce nut.
Figure 3:
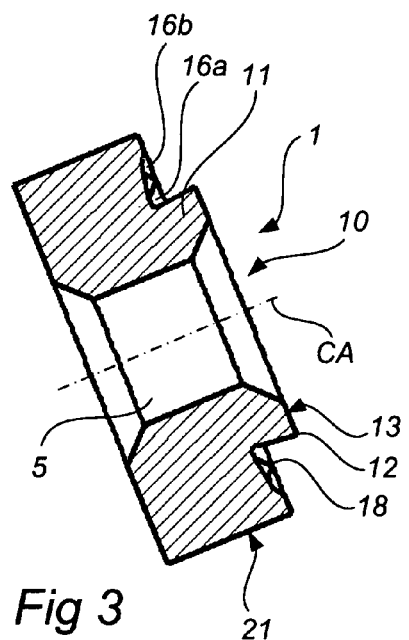
FIG. 3 is a sectional view of the pierce nut along the section II-II.
Figure 4A:
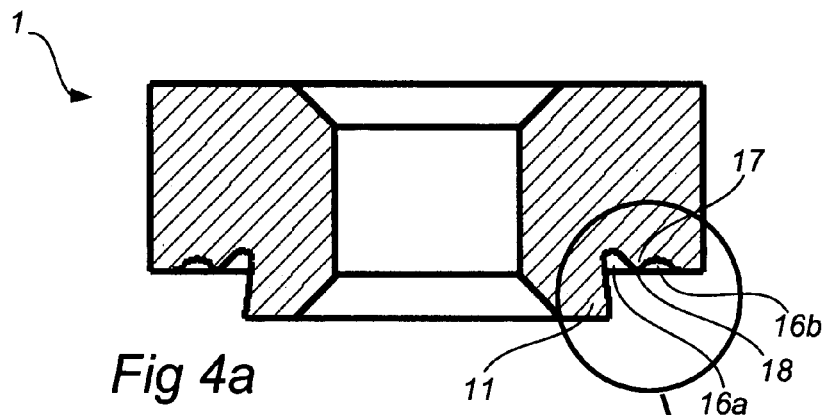
FIGS. 4a and 4b represent a sectional view along the section I-I of a pierce nut designed for great sheet thicknesses of, for example, about 1.3-1.6 mm, with a broken away enlarged detail thereof.
Figure 4B:
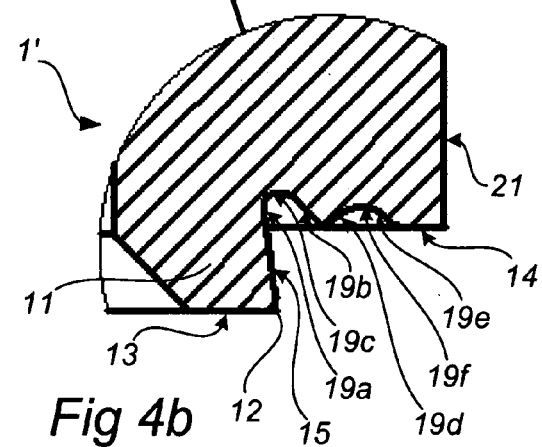
Figure 5:
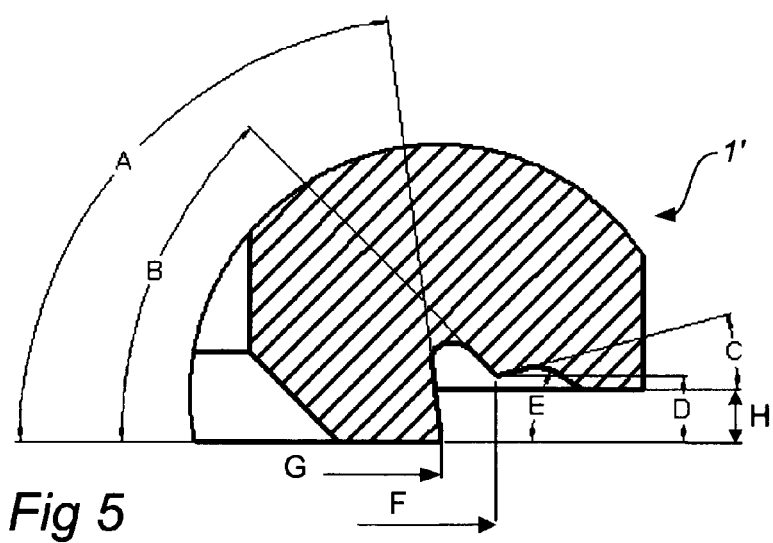
FIG. 5 is an enlarged sectional view along the section I-I, corresponding to that of FIG. 4b, the angles and dimensions being indicated. The pierce nut shown in FIG. 5 is designed for small sheet thicknesses of, for example, about 0.7-1.2 mm.

The pierce nut 1 is designed so as to punch its own hole during the punching operation and to push sheet material into grooves, undercuts etc. in the pierce nut during the operation.

Depending on the sheet thickness, there are different optimized geometries.

The pierce nut 1 has a centered, threaded through hole 5. On the underside of the pierce nut, in the following referred to as the engagement side 10, a pilot 11 protrudes. The protrusion H of the pilot 11 relatively to the end surface 14 of the other portion on the engagement side 10 depends primarily on the sheet thickness. Generally, the protrusion H is about 1.2 mm for sheet thicknesses up to about 1.3-1.6 mm and about 0.65 mm for sheet thicknesses up to about 0.7-1.2 mm.

Figure 6:
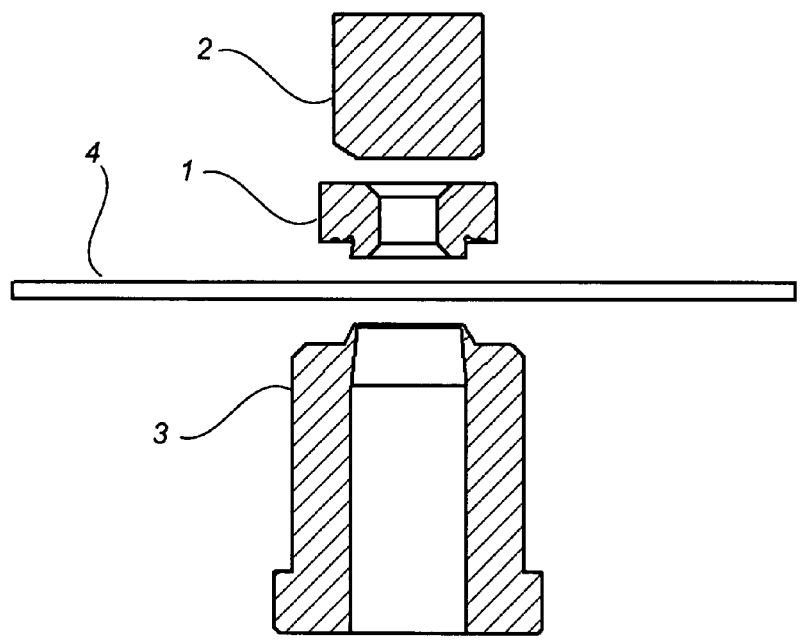
FIG. 6 shows the pierce nut with punching device and sheet before the engagement between the pierce nut and the sheet.
Figure 7:
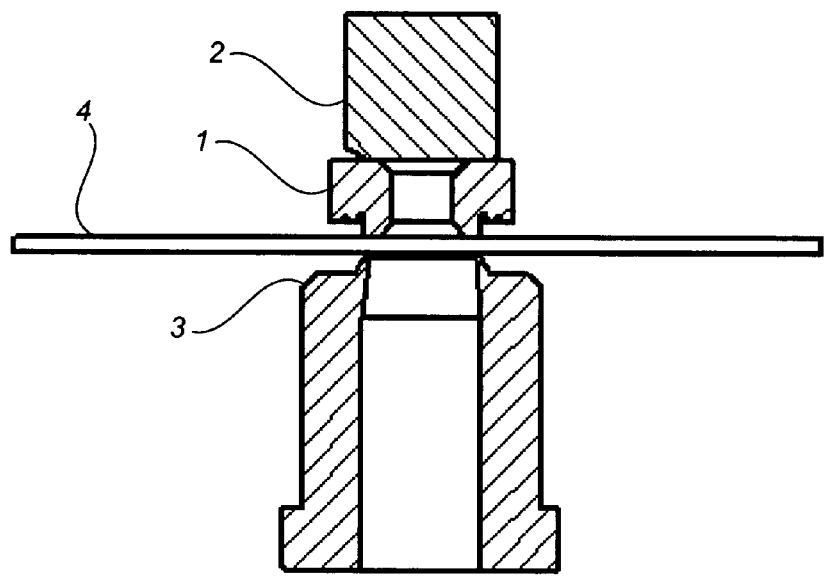
FIG. 7 shows the pierce nut with punching device and sheet in connection with the engagement between the pierce nut and the sheet.
Figure 8:
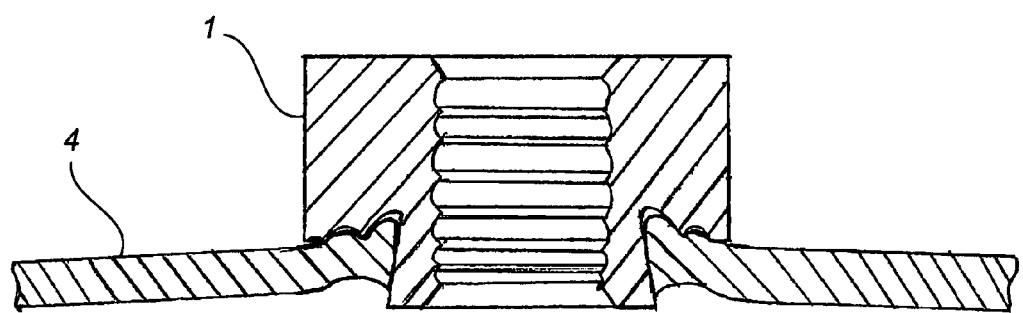
FIG. 8 shows the pierce nut when mounted in the sheet.

The pilot 11 has a plane, annular end surface 13 with a punching edge 12 which engages a sheet 4 and a punching die 3 during the actual punching (FIGS. 6-8). Radially outside the pilot 11, an annular wall surface 15 is provided which is inclined inwards towards the radial center CA of the nut and, thus, forms an undercut portion. The inclination (angle A) is adapted so that the wall engages the sheet across the entire surface during punching. It has been found that an angle A of about 79±1° ensures an optimal result, in particular with respect to high-strength sheet metal, but also with respect to standard sheet metal.

Two annular grooves 16a, 16b are provided on the engagement side 10 of the pierce nut 1, between the external wall 21 of the pierce nut and the wall surface 15. The grooves 16a, 16b are shaped in such manner that there is a gap between them. Expressed differently, a ridge 17 is formed between the grooves 16a, 16b.

The first groove, the inner groove 16a, is located closest to the wall surface 15 and comprises an arc-shaped bottom portion 19c, an inclined first surface portion 19a with essentially the same inclination (A) as the wall surface 15 of the pilot 11 and a second surface portion 19b which is inclined at an angle B of about 45° to the end surface 13. The inclination of the second end portion 19b is adapted so as to reduce the stress to which the pierce nut and the sheet are subjected during punching as the sheet is pushed into the groove 16a, 16b.

The second groove, the outer groove 16b, is located radially outside the inner groove and consists of an inclined fourth surface portion 19d, an arc-shaped bottom portion 19f and an inclined fifth surface portion 19e, with an inclination E relatively to the end surface 13. The purpose of this outer groove 16b is to reduce the punching force to make it easier for the sheet 4 to flow into the inner groove 16a.

For sheet thicknesses of about 1.3-1.6 mm, the fifth surface portion 19e may have an inclination E of about 45° and be perpendicular to the inclination C of the fourth surface portion 19d.

For sheet thicknesses of about 0.7-1.2 mm, the fourth surface portion 19d may have an inclination of 15° and the fifth surface portion 19e an inclination E of 31°.

In this way, an edge 18 is formed between the second surface portion 19b of the inner groove 16a and the fourth surface portion 19d of the outer groove. The edge may be pointed.

The function of the edge 18 is to guide the sheet above all into the inner groove 16a towards the external wall 15 of the pilot 11, but also into the outer groove 16b as the sheet is being deformed during the punching operation, so as to fix the pierce nut.

The inclined walls of the grooves can be adjusted to achieve this in an optimal manner.

The advantage of the pointed edge 18 is that essentially the same amount of punching force can be used for high-strength sheet metal as for conventional sheet metal to achieve the same degree of deformation in the sheet during punching.

Thus, a small sheet deformation with high pull-out and pull-through resistance is obtained.

To obtain the best result, the tip of the edge 18 should be positioned at a distance D from a plane including the pilot's end surface 13, which generally is about 1.2 mm for sheet thicknesses of about 1.3-1.6 mm and about 0.8 for sheet thicknesses of about 0.7-1.2 mm. The edge may also be located on a diameter F that is about 1.45±0.1 mm larger than a maximum diameter G of the pilot 11, thereby to obtain the best possible outcome, i.e., a joint with high torque and pull-through resistance.

In the case of a pierce nut with a dimension M6, the diameter F may be, for example, about 10.9 mm for sheet thicknesses of about 0.7-1.2 mm and about 11 mm for sheet thicknesses of about 1.3-1.6 mm.

To further improve the torque resistance of the pierce nut and prevent it from rotating relatively to the metal sheet, a plurality of recesses 20 may be provided on the engagement side of the pierce nut 1. The recesses 20 may be arranged at essentially the same radial distance from the center CA of the pierce nut and distributed around the pilot 11. In the embodiments shown in the drawings, the recesses 20 are located in the groove 16a, 16b and are evenly distributed along the edge 18. The recesses may also be located in the ridge 17, in such manner that the ridge has a plurality of segments arranged around the pilot.

Alternatively, anti-rotation means can be arranged in the form of recesses or protrusions in any of the surfaces shown, for example the wall surface 15, the surfaces 19a, 19b, 19c, 19d, 19e, 19f in the grooves 16a, 16b, on the ridge 17, in the abutment surface 14 or in the external wall 21.

Such anti-rotation means allow form-fit locking of the pierce nut to be achieved when the sheet is pushed into the grooves 16a, 16b. During punching, the sheet is pressed against the edge 18 between the two annular grooves 16a, 16b. The edge 18 guides the sheet into the grooves 16a, 16b and the sheet is pushed towards the wall surface 15 of the pilot 11 and forms the geometrical lock by engaging the undercut portion. The pierce nut is thus retained in its position both by the form-fit locking and by frictional forces.

To improve the punching of high-strength sheet metal and allow the compensation of alignment errors occurring between the pierce nut and the punching die, the size of the pilot's end surface 13 may be increased compared with conventional pilots. The result is a more stable process and better protection for the thread in the case of an alignment error between the pierce nut and the punching die.

Owing to the design of the pierce nut described above, high torque resistance and pull-through resistance are maintained in the joint between the nut and sheet, also in the case of repeated disassembly and assembly of parts that engage the pierce nut.

The form-fit locking design of the pierce nut allows the dimensions to be reduced and a compact pierce nut geometry is obtained compared with conventional pierce nuts.

FIGS. 6-8 illustrate the punching operation using the pierce nuts 1 described above.

In FIG. 6, the punch 2, the pierce nut 1, the sheet 4 and the punching die 3 are positioned at a distance from one another.

FIG. 7 illustrates the punching operation at the moment when a punching engagement between the pierce nut and the sheet is initiated.

FIG. 8 shows how the pierce nut 1 has been attached to the sheet 4. It is worth noting how the sheet has been deformed and flowed into the grooves and is retained in its position by the undercut portion formed by pilot 11 and its wall surface 15.

FIGS. 9a-9d display the results of measurements of pull-through resistance (push out force) and displacement of the nut-and-sheet joint.

Figure 9A:
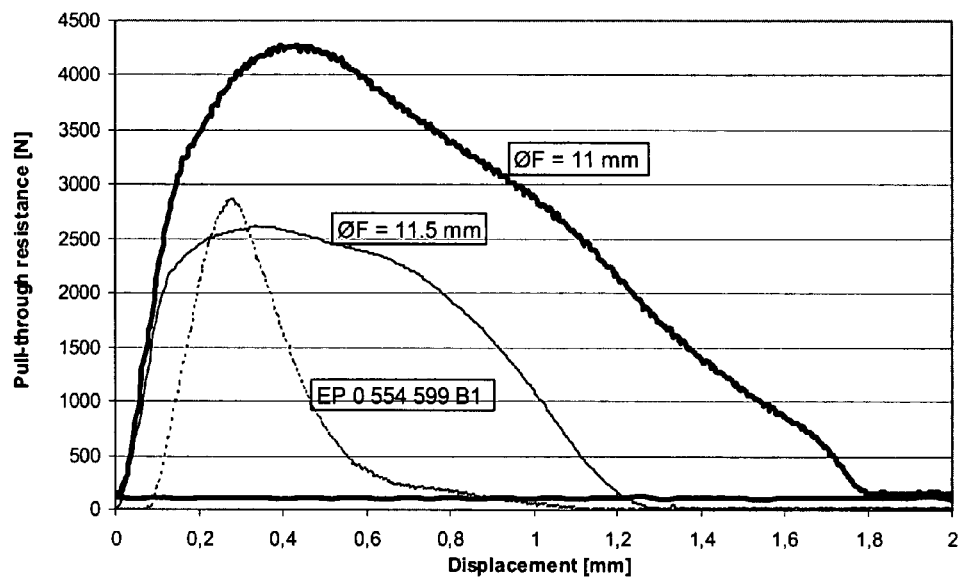
FIG. 9 shows torque resistance-displacement graphs for high-strength sheet metal (Rp 0.2=350-450 MPa) with a sheet thickness of 1.45 mm.
FIG. 9b shows torque resistance-displacement graphs for conventional/high-strength sheet metal (Rp 0.2=260 MPa) with a sheet thickness of 1.45 mm.
FIG. 9c shows torque resistance-displacement graphs for extra high-strength sheet metal (Rp 0.2=500-650 MPa) with a sheet thickness of 1.5 mm.
FIG. 9d shows torque resistance-displacement graphs for conventional/high-strength sheet metal (Rp 0.2=260 MPa) with a sheet thickness of 1.45 mm.

FIG. 9a illustrates pull-through resistance-displacement graphs for high-strength sheet metal (Rp 0.2=350-450 MPa) with a sheet thickness of 1.45 mm. In FIG. 9a, a conventional M6 pierce nut, such as the one shown in EP 0 554 599 B1, is compared with M6 pierce nuts designed according to the present document. It appears from FIG. 9a that a diameter F of 11 mm offers a considerable improvement over a diameter F of 11.5 mm. It also appears from the graph that both pierce nuts according to the present document offer improvements over the conventional pierce nut. The pierce nut with a diameter F of 11.5 mm withstands significantly greater displacement than the conventional pierce nut.

Figure 9B:
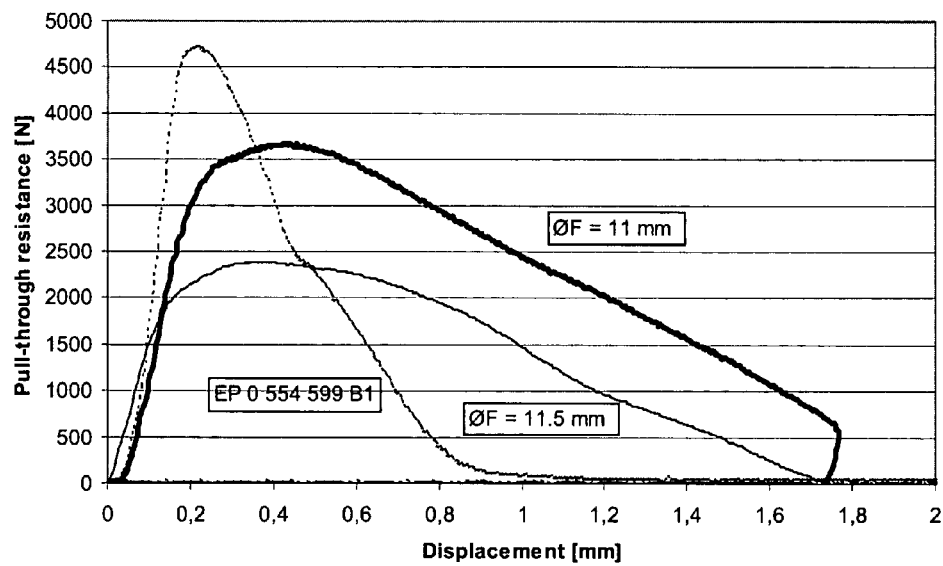

FIG. 9b shows pull-through resistance-displacement graphs for conventional/high-strength sheet metal (Rp 0.2=260 MPa) with a plate thickness of 1.45 mm. In FIG. 9b, a conventional M6 pierce nut, such as the one shown in EP 0 554 599 B1, is compared with M6 pierce nuts designed according to the present document. For this sheet type too, a significant improvement in the ability of the pierce nut to withstand displacement is obtained. It is to be noted that, in this case too, a diameter F of 11 mm offers an improvement over a diameter of 11.5 mm.

Figure 9C:
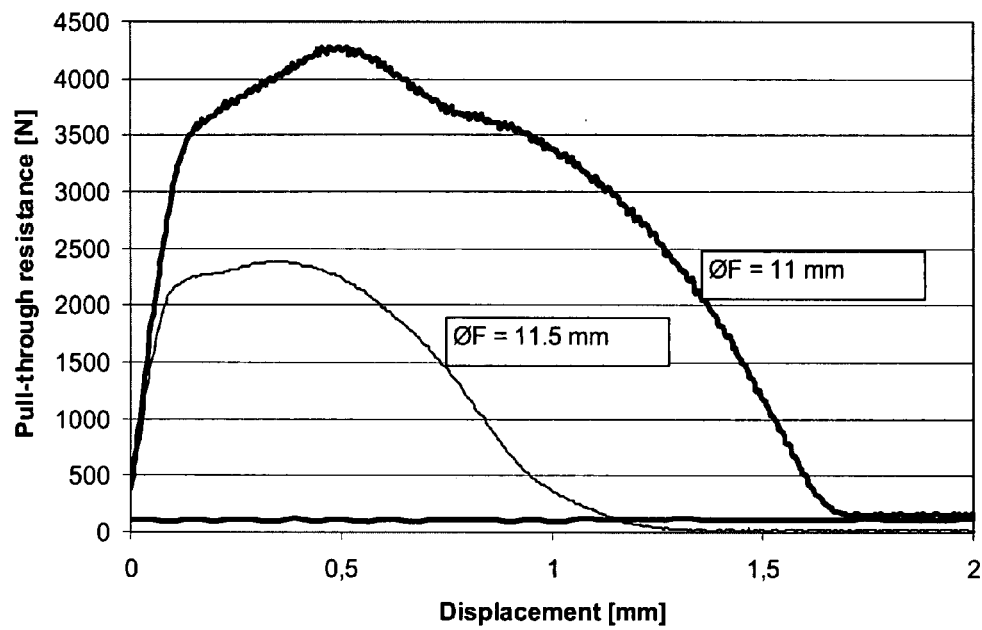

FIG. 9c shows pull-trough resistance-displacement graphs for extra high-strength sheet metal (Rp 0.2=500-650 MPa) with a sheet thickness of 1.5 mm. In FIG. 9c, a comparison is made between two M6 pierce nuts designed according to the present document. As is shown in FIG. 9c, a diameter F of 11 mm offers a major improvement over a diameter F of 11.5 mm.

FIGS. 9a-9c thus show that the diameter F is very important for the pull-through resistance of the pierce nut and its ability to withstand displacement, and thereby for optimizing the joint between pierce nut and sheet.

Figure 9D:
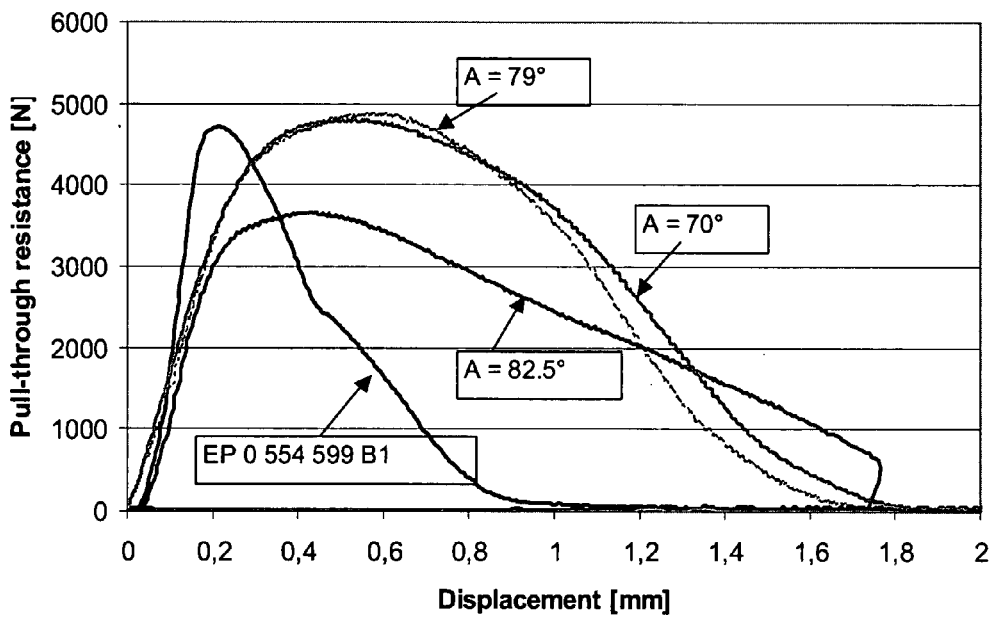

FIG. 9d shows pull-trough resistance-displacement graphs for conventional/high-strength sheet metal (Rp 0.2=260 MPa) with a sheet thickness of 1.45 mm. In FIG. 9d three different M6 pierce nuts according to the present document are compared with a conventional pierce nut as described in EP 0 554 599 B1.

It can be noted that the pierce nuts according to the present document withstand significantly greater displacement than the conventional pierce nut. Moreover, it is noted that an angle A of 79 degrees offers the best combination of pull-through resistance and displacement. A reduction of A to 70 degrees has a smaller negative effect than an increase of A to 82.5 degrees.

It will be appreciated that the pierce nut 1 can be essentially circular, as shown in the appended drawings.

However, other geometrical shapes are conceivable. For example, it is easy to change the geometry of the pierce nut along the external wall 21, so as to give the pierce nut, for instance, an oval, elliptic or polygonal appearance (triangular, quadrangular, pentagonal etc.) instead of a round appearance. The pilot's wall surface 15 and the grooves 16*a*, 16*b* too can be designed in non-circular manner according to the above, which designs can, but do not have to, coincide with the appearance of the external wall 21.

I claim:

1. A pierce nut for punching through and attachment to a plastically deformable metal sheet, said pierce nut comprising:
   a pilot having an end surface that defines a portion of a front end of said pierce nut, said end surface of said pilot designed to engage and punch through the metal sheet to form an opening in the metal sheet when said end surface is forced against the metal sheet, said end surface positioned about a hole in said pilot, said end surface lies in an end surface plane;
   an abutment surface spaced rearwardly of said end surface, said abutment surface defines an outer edge portion of said front end of said pierce nut, said abutment surface design to abut against the metal sheet after said end surface punches through the metal sheet, said abutment surface having a face that lies in an abutment surface plane, said abutment surface plane parallel to said end surface plane;
   a first groove positioned between said pilot and said abutment surface, said first groove having a first wall, a second wall and a transition surface connected between said first and second wall, an outer peripheral edge of said end surface terminating at said first wall, said first wall sloped downwardly from said end surface and toward a central axis of said pilot, said transition surface having an arcuate shape, said second wall sloped upwardly from said transition surface and away from said central axis of said pilot; and,
   a second groove which is positioned between said abutment surface and said first groove and at least partly surrounds the first groove, said second groove positioned rearwardly of said end surface of said pilot, said second groove having a first wall, a second wall and a transition surface connected between said first and second wall, said first wall of said second groove terminating at said second wall of said first groove, said first wall of said second groove sloped downwardly from abutment surface plane, said transition surface of said second groove having an arcuate shape, said second wall of said second groove sloped upwardly from said transition surface of said second groove and away from said central axis of said pilot and terminating at said abutment surface.

2. The pierce nut as defined in claim 1, wherein an angle of said first wall of said first groove is about 69-89′.

3. The pierce nut as defined in claim 2, wherein an angle of said first wall of said first groove is about 74-84°.

4. The pierce nut as defined in claim 1, wherein said second wall of said first groove has an angle of about 35-55°.

5. The pierce nut as defined in claim 4, wherein said second wall of said first groove has an angle of about 40-50°.

6. The pierce nut as defined in claim 1, wherein said first wall of said second groove has an angle of about 15-45°.

7. The pierce nut as defined in claim 6, wherein said second wall of said second groove is about 10-70°.

8. The pierce nut as defined in claim 7, wherein said angle of said second wall of said second groove is about 30-45°.

9. The pierce nut as defined in claim 1, including an anti-rotation means.

10. The pierce nut as defined in claim 9, wherein said anti-rotation means is provided in one or both of said first and second grooves, said anti-rotation means including a plurality of spaced apart recesses or protrusions.

11. The pierce nut as defined in claim 1, wherein said second wall of said first groove and said first wall of said second groove join to form a point.

12. The pierce nut as defined in claim 11, wherein said point is positioned rearwardly of said abutment surface plane.

13. A pierce nut for punching through and attachment to a plastically deformable metal sheet, said pierce nut comprising:
   a pilot having an end surface that defines a portion of a front end of said pierce nut, said end surface of said pilot designed to engage and punch through the metal sheet to form an opening in the metal sheet when said end surface is forced against the metal sheet, said end surface positioned about a hole in said pilot, said end surface lies in an end surface plane;
   an abutment surface spaced rearwardly of said end surface, said abutment surface defines an outer edge portion of said front end of said pierce nut, said abutment surface design to abut against the metal sheet after said end surface punches through the metal sheet, said abutment surface having a face that lies in an abutment surface plane;
   a first groove positioned between said pilot and said abutment surface, said first groove having a first wall, a second wall and a transition surface connected between said first and second wall, an outer peripheral edge of said end surface terminating at said first wall; and,
   a second groove which is positioned between said abutment surface and said first groove and surrounds said first groove, said second groove positioned rearwardly of said end surface of said pilot, said second groove having a first wall, a second wall and a transition surface connected between said first and second wall, said first wall of said second groove positioned adjacent said second wall of said first groove, said first wall of said second groove sloped downwardly from said abutment surface plane, said second wall of said second groove sloped upwardly from said transition surface of said second groove and away from said central axis of said pilot and terminating at said abutment surface.

14. The pierce nut as defined in claim 13, wherein said first wall of said first groove sloped downwardly from said end surface and toward a central axis of said pilot, said second wall of said first groove sloped upwardly from said transition surface and away from said central axis of said pilot.

15. The pierce nut as defined in claim 14, wherein at least one of said transition surfaces of said first and second groove has an arcuate surface.

16. The pierce nut as defined in claim 15, wherein said second wall of said first groove and said first wall of said second groove join to form a point.

17. The pierce nut as defined in claim 16, wherein said point is positioned rearwardly of said abutment surface plane.

18. The pierce nut as defined in claim 17, including an anti-rotation means, said anti-rotation means is provided in one or both of said first and second grooves, said anti-rotation means including a plurality of spaced apart recesses or protrusions.

19. The pierce nut as defined in claim 16, including an anti-rotation means, said anti-rotation means is provided in one or both of said first and second grooves, said anti-rotation means including a plurality of spaced apart recesses or protrusions.

20. The pierce nut as defined in claim 13, wherein at least one of said transition surfaces of said first and second groove has an arcuate surface.

21. The pierce nut as defined in claim 13, wherein said second wall of said first groove and said first wall of said second groove join to form a point.

22. The pierce nut as defined in claim 21, wherein said point is positioned rearwardly of said abutment surface plane.

23. The pierce nut as defined in claim 13, including an anti-rotation means, said anti-rotation means is provided in one or both of said first and second grooves, said anti-rotation means including a plurality of spaced apart recesses or protrusions.

24. The pierce nut as defined in claim 13, wherein an angle of said first wall of said first groove is about 69-89°.

25. The pierce nut as defined in claim 13, wherein said second wall of said first groove has an angle of about 35-55°.

26. The pierce nut as defined in claim 13, wherein said first wall of said second groove has an angle of about 15-45°.

27. The pierce nut as defined in claim 13, wherein said second wall of said second groove is about 10-70°.

* * * * *